United States Patent
Gandikota et al.

(10) Patent No.: US 10,890,327 B2
(45) Date of Patent: Jan. 12, 2021

(54) LINER OF A GAS TURBINE ENGINE COMBUSTOR INCLUDING DILUTION HOLES WITH AIRFLOW FEATURES

(71) Applicant: General Electric Company, Schenectady, NY (US)

(72) Inventors: Gurunath Gandikota, Bangalore (IN); Hiranya Kumar Nath, Bangalore (IN); Arvind Kumar Rao, Bangalore (IN); Steven Clayton Vise, Loveland, OH (US); Perumallu Vukanti, Bangalore (IN); Mayank Krisna Amble, Bangalore (IN); Clayton Stuart Cooper, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 242 days.

(21) Appl. No.: 15/896,223

(22) Filed: Feb. 14, 2018

(65) Prior Publication Data

US 2019/0249874 A1   Aug. 15, 2019

(51) Int. Cl.
| | | |
|---|---|---|
| *F23R 3/00* | (2006.01) | |
| *F23R 3/16* | (2006.01) | |
| *F23R 3/06* | (2006.01) | |
| *F23R 3/14* | (2006.01) | |
| *F23R 3/08* | (2006.01) | |

(52) U.S. Cl.
CPC ............... *F23R 3/002* (2013.01); *F23R 3/06* (2013.01); *F23R 3/16* (2013.01); *F23R 3/08* (2013.01); *F23R 3/14* (2013.01); *F23R 2900/03042* (2013.01)

(58) Field of Classification Search
CPC .... F23R 3/002; F23R 3/06; F23R 3/16; F23R 3/08; F23R 3/14; F23R 2900/03042; F23R 2900/03045
See application file for complete search history.

(56) References Cited

U.S. PATENT DOCUMENTS

| | | | | |
|---|---|---|---|---|
| 2,510,645 | A | * 6/1950 | McMahan | F23R 3/04 60/796 |
| 2,916,878 | A | * 12/1959 | Wirt | F23R 3/04 60/759 |
| 3,846,062 | A | * 11/1974 | Quinn | F23C 9/00 431/116 |
| 4,064,300 | A | * 12/1977 | Bhangu | F23R 3/002 428/120 |
| 4,300,349 | A | 11/1981 | Heckel | |
| 4,622,821 | A | * 11/1986 | Madden | F23R 3/06 60/755 |
| 4,700,544 | A | * 10/1987 | Fucci | F23R 3/045 60/757 |
| 4,838,031 | A | 6/1989 | Cramer | |
| 5,050,385 | A | * 9/1991 | Hirose | B23K 9/046 60/752 |

(Continued)

*Primary Examiner* — Jason H Duger
(74) *Attorney, Agent, or Firm* — Dority & Manning, P.A.

(57) ABSTRACT

A gas turbine engine combustor includes a liner defining at least in part a combustion chamber, a first side exposed to the combustion chamber, a second side opposite the first side, and a dilution hole extending from the second side to the first side. The liner includes an airflow feature on the first side of the liner adjacent to the dilution hole and extending into the combustion chamber to increase a cooling of the liner.

17 Claims, 9 Drawing Sheets

(56) References Cited

U.S. PATENT DOCUMENTS

| | | | |
|---|---|---|---|
| 5,261,223 A | 11/1993 | Foltz | |
| 5,279,127 A | 1/1994 | Napoli | |
| 6,145,319 A | 11/2000 | Burns et al. | |
| 6,170,266 B1 | 1/2001 | Pidcock et al. | |
| 6,205,789 B1 | 3/2001 | Patterson et al. | |
| 6,237,344 B1 | 5/2001 | Lee | |
| 6,402,464 B1 | 6/2002 | Chiu et al. | |
| 6,526,756 B2 | 3/2003 | Johnson et al. | |
| 6,557,349 B1 | 5/2003 | Young et al. | |
| 8,387,397 B2 * | 3/2013 | Chen | F23R 3/06 60/752 |
| 8,448,443 B2 * | 5/2013 | Berry | F23R 3/045 60/754 |
| 8,511,089 B2 | 8/2013 | Bastnagel et al. | |
| 8,572,983 B2 | 11/2013 | Xu | |
| 8,650,882 B2 | 2/2014 | Woolford et al. | |
| 9,109,452 B2 | 8/2015 | Martin et al. | |
| 9,175,856 B2 * | 11/2015 | Sandelis | F23R 3/06 |
| 9,719,684 B2 | 8/2017 | Pinnick et al. | |
| 10,495,309 B2 * | 12/2019 | Bunker | F01D 5/186 |
| 2003/0182943 A1 | 10/2003 | Gerendas et al. | |
| 2014/0260257 A1 | 9/2014 | Rullaud et al. | |
| 2015/0159878 A1 * | 6/2015 | Schildmacher | F23R 3/58 60/776 |
| 2016/0116166 A1 * | 4/2016 | Drake | F23R 3/005 60/752 |
| 2016/0238249 A1 * | 8/2016 | Cunha | F23R 3/005 |

* cited by examiner

LINER OF A GAS TURBINE ENGINE COMBUSTOR INCLUDING DILUTION HOLES WITH AIRFLOW FEATURES

FIELD

The present subject matter relates generally to a liner for a gas turbine engine combustor.

BACKGROUND

A gas turbine engine typically includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. For example, in at least certain embodiments, the gas turbine engine may further include a fan driven by the one or more turbines.

Additionally, typical combustion sections include one or more liners defining a combustion chamber. Dilution holes may be defined within these liners to promote more complete combustion, or for other purposes, such as combustor dynamics or temperature management purposes. The dilution holes allow for a stream of relatively cool compressed air to flow into the combustion chamber. Notably, however, hotspots may form around an outlet of the dilution holes where the stream of compressed air flows through the dilution holes into the combustion chamber, potentially damaging or prematurely wearing the liner. Accordingly, a liner capable of reducing, or better managing, these hotspots would be useful.

BRIEF DESCRIPTION

Aspects and advantages of the invention will be set forth in part in the following description, or may be obvious from the description, or may be learned through practice of the invention.

In one exemplary embodiment of the present disclosure a gas turbine engine combustor is provided. The gas turbine engine combustor includes a liner defining at least in part a combustion chamber, a first side exposed to the combustion chamber, a second side opposite the first side, and a dilution hole extending from the second side to the first side. The liner includes an airflow feature on the first side of the liner adjacent to the dilution hole and extending into the combustion chamber to increase a cooling of the liner.

In one exemplary embodiment the combustion chamber defines an airflow direction over the dilution hole on the first side of the liner and a transverse direction perpendicular to the airflow direction, and wherein the airflow feature is positioned adjacent to the dilution hole along the transverse direction.

For example, in certain exemplary embodiments the dilution hole of the liner is a first dilution hole, wherein the liner further defines a second dilution hole spaced from the first dilution hole along the transverse direction, and wherein the airflow feature is positioned between the first dilution hole and the second dilution hole.

For example, in certain exemplary embodiments the airflow feature is a first airflow feature, wherein the liner further includes a second airflow feature on the first side of the liner extending into the combustion chamber, and wherein the second airflow feature is positioned on an opposite side of the dilution hole from the first airflow feature along the transverse direction.

In one exemplary embodiment the airflow feature defines a perimeter shape, and wherein the perimeter shape is substantially an ellipse, a circle, or an oval.

In one exemplary embodiment the airflow feature defines a perimeter shape, and wherein the perimeter shape is substantially half of an ellipse, half of a circle, or half of an oval.

In one exemplary embodiment the dilution hole defines a diameter, wherein the airflow feature defines a width, and wherein the width of the airflow feature is greater than about 0.25 times the diameter and less than about 5 times the diameter.

In one exemplary embodiment the dilution hole defines a diameter, wherein the airflow feature defines a height, and wherein the height of the airflow feature is greater than about 0.25 times the diameter and less than about 5 times the diameter.

In one exemplary embodiment the liner further defines a cooling hole through the liner, and wherein the cooling hole defines an outlet on the airflow feature.

For example, in certain exemplary embodiments the combustion chamber defines an airflow direction over the dilution hole on the first side of the liner, and wherein the cooling hole extends generally along the airflow direction.

For example, in certain exemplary embodiments the combustion chamber defines an airflow direction over the dilution hole on the first side of the liner, and wherein the cooling hole extends generally opposite the airflow direction.

In one exemplary embodiment the combustion chamber defines an airflow direction over the dilution hole on the first side of the liner and a transverse direction perpendicular to the airflow direction, wherein the dilution hole of the liner is a first dilution hole, wherein the liner further defines a second dilution hole spaced from the first dilution hole along the transverse direction, wherein the airflow feature is positioned between the first dilution hole and the second dilution hole, and wherein the liner further defines a third dilution hole extending through the liner and defining an outlet on the airflow feature.

For example, in certain exemplary embodiments the first dilution hole defines an outlet having a cross-sectional area, wherein the third dilution hole defines an outlet having a cross-sectional area, and wherein the cross-sectional area of the outlet of the third dilution hole is less than the cross-sectional area of the outlet of the first dilution hole.

In one exemplary embodiment the airflow feature defines an aerodynamic profile.

In one exemplary embodiment the combustor defines a longitudinal direction, and wherein the airflow direction defines a swirl angle greater than zero with the longitudinal direction.

In another exemplary embodiment of the present disclosure, a gas turbine engine combustor is provided. The gas turbine engine combustor includes a liner defining a first side, a second side opposite the first side, a dilution hole extending between the first side and the second side and defining a diameter, and a combustion chamber with one of the first side or second side being exposed to the combustion chamber. The liner includes an airflow feature on the first side of the liner adjacent to the dilution hole to increase a cooling of the liner, the airflow feature defining an aerodynamic profile and a length greater than or equal to the diameter of the dilution hole.

In one exemplary embodiment the first side of the liner is exposed to the combustion chamber.

In one exemplary embodiment the second side of the liner is exposed to the combustion chamber.

For example, in certain exemplary embodiments the combustion chamber defines an airflow direction over the dilution hole on the second side of the liner and a transverse direction perpendicular to the airflow direction, and wherein the airflow feature is positioned adjacent to the dilution hole along the transverse direction.

For example, in certain exemplary embodiments the combustion chamber defines an airflow direction over the dilution hole on the second side of the liner, wherein the airflow feature is positioned downstream of the dilution hole along the airflow direction, and wherein the liner defines an indentation in the first side of the liner, and wherein the indentation is positioned adjacent to the dilution hole along the airflow direction at a location upstream of the dilution hole along the airflow direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

It will be appreciated that use of the same or similar numbers throughout the Figures may refer to same or similar part.

DETAILED DESCRIPTION

Figure 1:
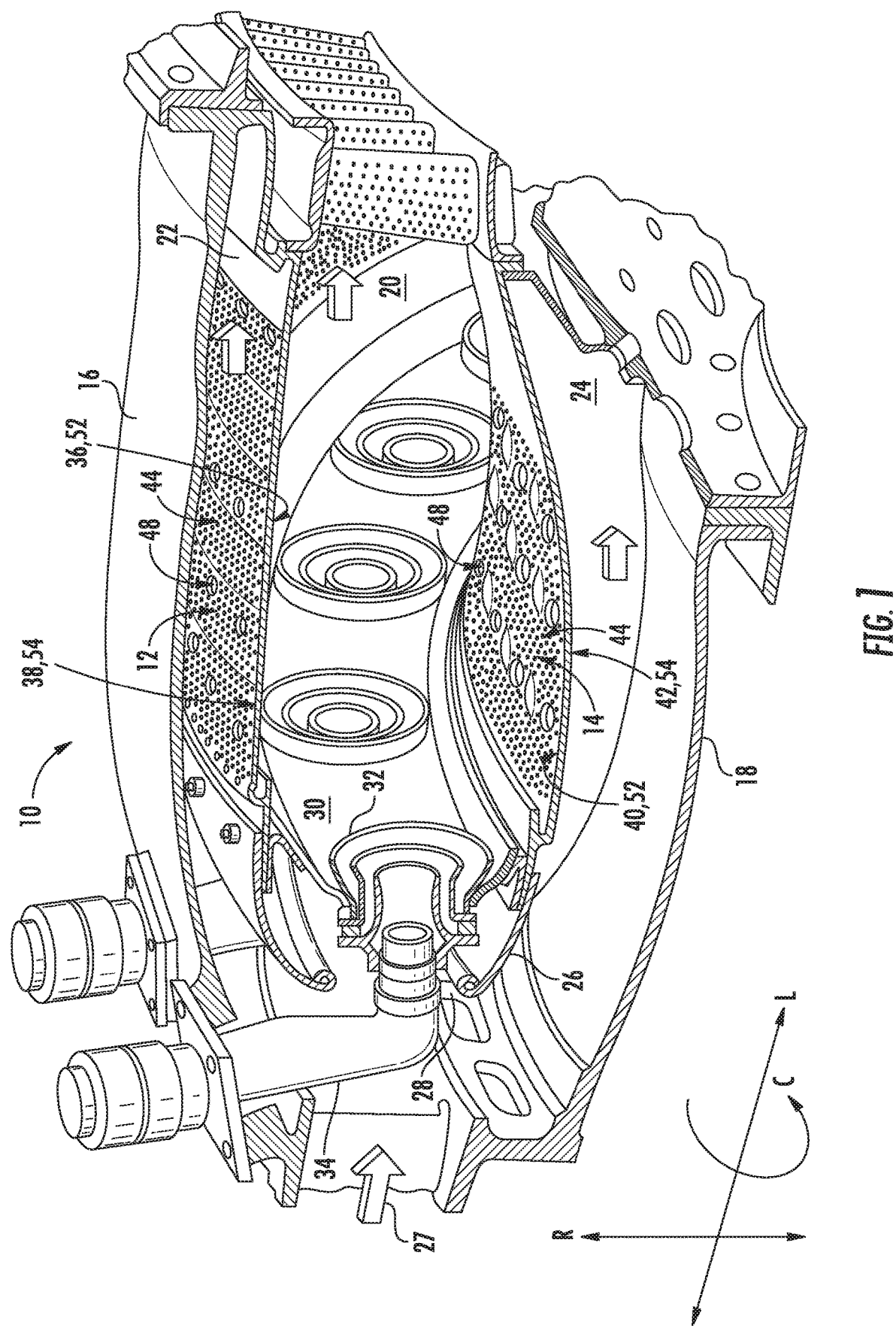
FIG. 1 is a perspective view of a gas turbine engine combustor in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring to the drawings wherein identical reference numerals denote the same elements throughout the various views, FIG. 1 shows a combustor 10 of the type suitable for use in a gas turbine engine. For example, the exemplary combustor 10 depicted may be utilized within an aeronautical gas turbine engine, such as a turboshaft engine, turboprop engine, turbojet engine, etc. Additionally, or alternatively, the combustor 10 may be utilized in any other suitable gas turbine engine, such as an aeroderivative gas turbine engine, a power generation gas turbine engine, etc. As shown, combustor 10, or rather the gas turbine engine within which the combustor 10 is installed (not shown), defines a longitudinal direction L, a radial direction R, and a circumferential direction C.

Additionally, the combustor 10 includes a liner, and more specifically, an outer liner 12 and an inner liner 14 disposed between an outer combustor casing 16 and an inner combustor casing 18. Outer and inner liners 12 and 14 are radially spaced from each other to define at least in part a combustion chamber 20. Outer liner 12 and outer casing 16 form an outer passage 22 therebetween, and inner liner 14 and inner casing 18 form an inner passage 24 therebetween. A cowl assembly 26 is mounted to the upstream ends of outer and inner liners 12 and 14. An annular opening 28 is formed in cowl assembly 26 for the introduction of compressed air into combustor 10. The compressed air is supplied from a compressor (not shown) in a direction generally indicated by arrow 27 of FIG. 1. The compressed air passes principally through annular opening 28 to support combustion and partially into outer and inner passages 22 and 24 where it is used to cool the liners 12 and 14.

Disposed between and interconnecting the outer and inner liners 12, 14 near their upstream ends is an annular dome plate 30. A plurality of circumferentially spaced swirler assemblies 32 is mounted in dome plate 30. Each swirler assembly 32 receives compressed air from annular opening 28 and fuel from a corresponding fuel tube 34. The fuel and air are swirled and mixed by swirler assemblies 32, and the resulting fuel/air mixture is discharged into combustion chamber 20. It is noted that although FIG. 1 illustrates one temporary embodiment of a single annular combustor, the present disclosure is equally applicable to any type of combustor, including double annular combustors, which uses multi-hole film cooling, etc.

Outer and inner liners 12, 14 each have an annular and axially extending configuration. In at least certain embodiments, the outer and inner liners 12, 14 may be a single shell, such as a single metal or metal alloy shell. However, in other embodiments, the outer and inner liners 12, 14 may instead be formed of a ceramic matrix composite material, or any other suitable material (such as a combination of two or more materials). Further, it will be appreciated that the outer and inner liners 12, 14 may be formed through any suitable process. For example, in certain embodiments, one or both of the outer and inner liners 12, 14 may be formed using an additive manufacturing, or 3D printing, process. Such may provide for a relatively cost-effective means for forming a liner having the various airflow features described below.

Referring still to FIG. 1, the outer liner 12 defines a first side 52 and a second side 54 opposite the first side 52. For the embodiment depicted, the first side 52 is a hot side 36 exposed to the combustion chamber 20 and facing the hot combustion gases in combustion chamber 20, and the second side 54 is a cold side 38 in contact with the relatively cool air in outer passage 22. Similarly, inner liner 14 defines a first side 52 and a second side 54 opposite the first side 52. As with the outer liner 12, the first side 52 of the inner liner 14 is a hot side 40 exposed to the combustion chamber 20 and facing the hot combustion gases in combustion chamber 20, and the second side 54 is a cold side 42 in contact with the relatively cool air in inner passage 24.

Moreover, as is also depicted in FIG. 1, for the embodiment shown, the outer liner and inner liner 12, 14 each define a plurality of cooling holes 44 therein to form a cooling film on the first sides 52/hot sides 36, 40 thereof. Additionally, the outer liner and inner liner 12, 14 each also define a plurality of dilution holes 48 for introducing dilution air to the combustion chamber 20. For the embodiment depicted, the dilution holes 48 are arranged in rows, with the rows spaced generally along the longitudinal direction L of the gas turbine engine, and the dilution holes 48 of each row spaced generally along the circumferential direction C of the gas turbine engine. Additionally, for the embodiment shown the dilution holes 48 are disposed in each of outer and inner liners 12 and 14. The dilution holes 48 are generally fewer in number than the cooling holes 44, and each dilution hole 48 has a cross-sectional area that is substantially greater than a cross-sectional area of one of the cooling holes 44. Dilution holes 48, and to a smaller extend cooling holes 44, serve to admit dilution air into combustor chamber 20 that will promote some additional combustion.

For example, conventionally the cooling holes 44 in typical combustor liners have relatively small diameters on the scale of about 0.02 inches and a circumferential hole spacing of about 0.13 inches, or about 6.5 hole diameters 62. By contrast, dilution holes 48 conventionally at a relatively large diameter 62 (see FIG. 3), such as greater than about 0.1 inches and up to about 1.5 inches.

Figure 2:
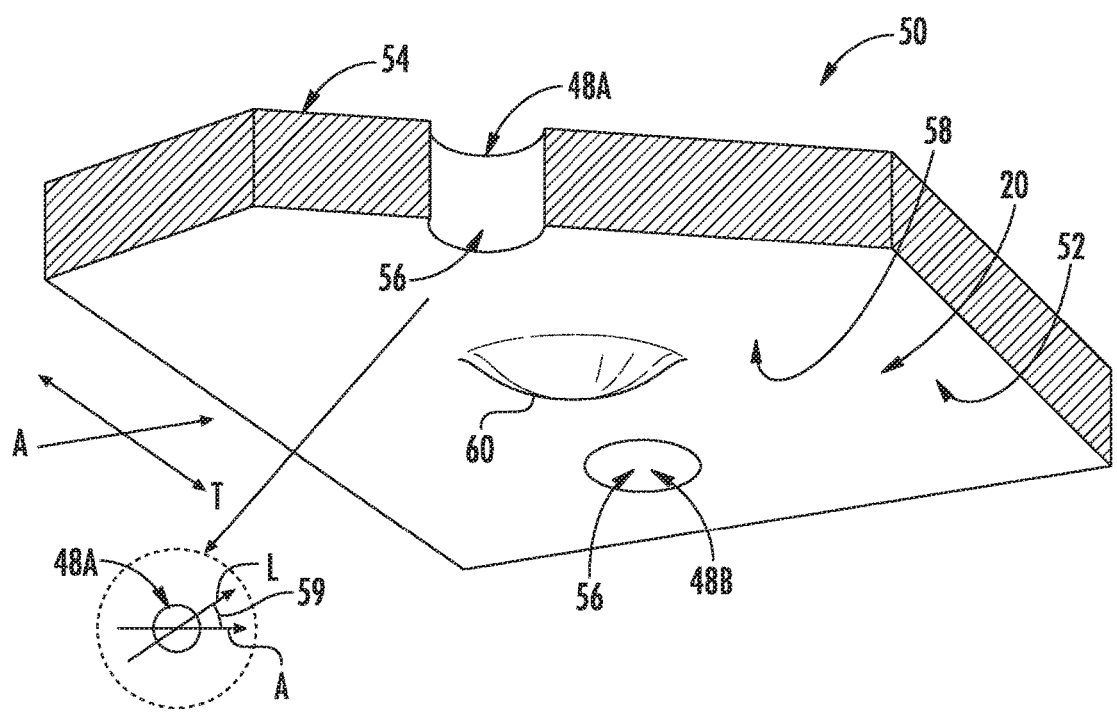
FIG. 2 is a perspective view of a section of a liner of the exemplary gas turbine engine combustor of FIG. 1 in accordance with an exemplary present disclosure.

Referring now to FIG. 2, a perspective, cut out view of a liner 50 for a gas turbine engine combustor in accordance with an exemplary embodiment of the present disclosure is provided. In certain exemplary embodiments, the liner 50 of FIG. 2 may be incorporated into the exemplary combustor 10 of the gas turbine engine described above with reference to FIG. 1. For example, in certain exemplary embodiments, the liner 50 of FIG. 2 may be one of the inner liner 14 or outer liner 12 of the combustor 10 of FIG. 1.

Accordingly, it will be appreciated that liner 50 defines at least in part a combustion chamber 20, a first side 52, a second side 54 opposite the first side 52 and a dilution hole 48 extending between the first side 52 and second side 54. For the embodiment depicted, the first side 52 is a hot side, and accordingly, the first side 52 is exposed to (and at least partially defines) the combustion chamber 20. Additionally, in such a manner, it will be appreciated that the dilution hole 48 extends from the second side 54 to the first side 52, defining an outlet 56 on the first side 52. Furthermore, during operation of the combustor, the combustion chamber 20 defines an airflow direction A over the dilution hole 48 on the first side 52 of the liner 50, as well as a transverse direction T perpendicular to the airflow direction A. The transverse direction T is also parallel to a surface 58 of the liner 50 on the first side 52, and may be locally aligned with a circumferential direction of the gas turbine engine including the combustor (e.g., the circumferential direction C of FIG. 1). Notably, in at least certain exemplary embodiments, the combustion gasses may "swirl" as they flow through the combustion chamber 20. For example, the combustion gasses may define a circumferential component (i.e., flow at least partially along the circumferential direction) in addition to a forward/longitudinal component (i.e., flow at least partially along the longitudinal direction L). In such a manner, the airflow direction A may define a swirl angle 59 with the longitudinal direction L, as is shown in the callout Circle 2A of FIG. 2, showing a plan view of the surface 58 of the liner 50. The swirl angle 59 may be greater than zero degrees, such as greater than about fifteen (15) degrees, and up to about forty-five (45) degrees.

More specifically, as with the embodiment depicted in FIG. 1, the liner 50 of FIG. 2 further includes a row of dilution holes 48 spaced along the transverse direction T. For example, FIG. 2 depicts a first dilution hole 48A and a second dilution hole 48B.

Figure 3:
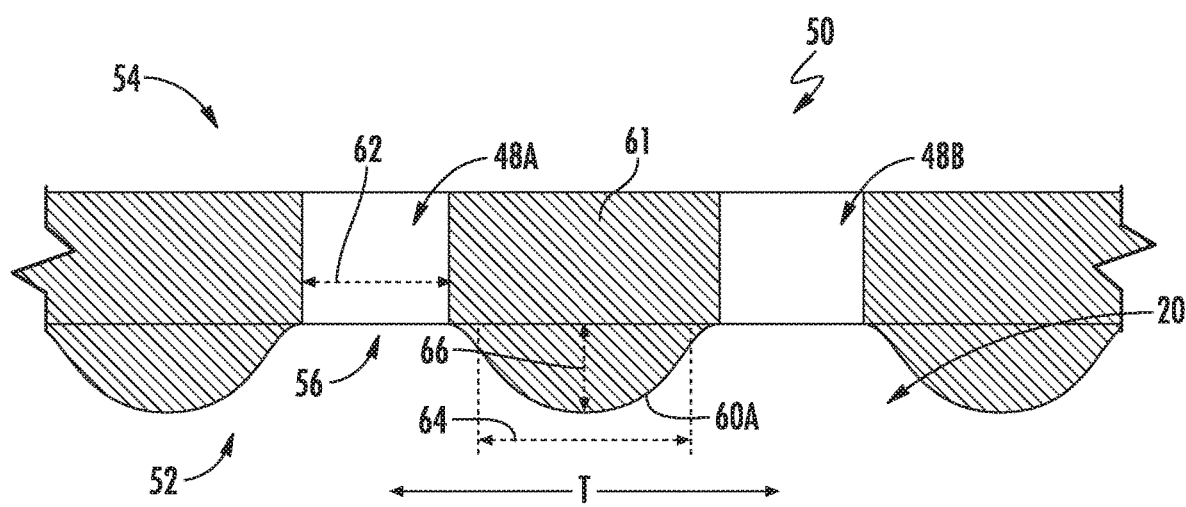
FIG. 3 is a cross-sectional view of the exemplary liner of FIG. 2 along an airflow direction.

Referring now also to FIG. 3, providing a cross-sectional view of the liner 50 of FIG. 2, along the airflow direction A, it will be appreciated that the liner 50 further includes an airflow feature 60 on the first side 52 of the liner 50 adjacent to the dilution hole 48 to increase a cooling of the liner 50. The exemplary airflow feature 60 depicted is configured as a protrusion, and accordingly extends into the combustion chamber 20. Notably, the first dilution hole 48A, or rather the plurality of dilution holes 48, each define a diameter 62, and more specifically, a diameter 62 at the outlet 56. As used herein, the term "adjacent to the dilution hole," with reference to a positioning of an airflow feature relative to a dilution hole, refers to such airflow feature 60 being spaced from the outlet 56 of the respective dilution hole 48 a distance no more than twice the diameter 62 of the dilution hole 48.

For the embodiment shown in FIG. 3, the airflow feature 60 is positioned adjacent to the first dilution hole 48A along the transverse direction T, and further, is positioned between the first dilution hole 48A and the second dilution hole 48B. For the embodiment depicted, the airflow feature 60 is spaced substantially evenly along the transverse direction T between the first dilution hole 48A and second dilution hole 48B. Moreover, for the embodiment depicted, the airflow feature 60 is a first airflow feature 60A and the liner 50 further includes a second airflow feature 60B on the first side 52 of the liner 50. The second airflow feature 60B is also configured as a protrusion, and accordingly, also extends into the combustion chamber 20. The second airflow feature 60B is positioned on an opposite side of the first dilution hole 48A from the first airflow feature 60A along the transverse direction T.

Notably, for the embodiment shown, the airflow features 60 are relatively large airflow features 60. For example, for the embodiment shown, the first airflow feature 60A defines a width 64, and more specifically, defines a width 64 along the transverse direction T. The width 64 of the first airflow feature 60A is greater than about 0.25 times the diameter 62 of the first dilution hole 48A that it is positioned adjacent to, and less than about five (5) times such diameter 62. For example, in certain embodiments, the width 64 of the first airflow feature 60A may be greater than or equal to about 0.5 times the diameter 62 of the first dilution hole 48A that it is positioned adjacent, such as greater than or equal to about 0.75 times the diameter 62, such as less than about 4.5 times, such as less than about three (3) times the diameter 62 of the first dilution hole 48A that it is positioned adjacent to. Additionally, the first airflow feature 60A defines a height 66. The height 66 is a maximum height 66 of the first airflow feature 60A relative to a local plane defined by the first side 52 of the liner 50 around the first airflow feature 60A, and more specifically, defined by the surface 58 of the first side 52 of the liner 50 around the first airflow feature 60A. For the embodiment depicted, the height 66 of the first airflow feature 60A is greater than about 0.25 times the diameter 62 of the first dilution hole 48A that it is positioned adjacent to, and less than about five (5) times such diameter 62. For example, in certain embodiments, the height 66 of the first airflow feature 60A may be greater than or equal to about 0.5 times the diameter 62 of the first dilution hole 48A to that is positioned adjacent, such as greater than or equal to about 0.75 times the diameter 62, such as less than about 4.5 times, such as less than about four (4) times, such as less than about three (3) times the diameter 62 of the first dilution hole 48A that it is positioned adjacent to.

Further, it should be appreciated that for the embodiment depicted, the liner 50 includes the airflow features 60 formed integrally with a base wall portion 61 of the liner 50. For example, the liner 50 may be formed as a single component using, e.g., 3D printing/additive manufacturing processes to form the liner 50. Accordingly, in certain embodiments, the airflow features 60 and base wall portion 61 may be formed integrally as a single, continuous component. However, in other exemplary embodiments, the liner 50 may be formed in any other suitable manner.

Figure 4:
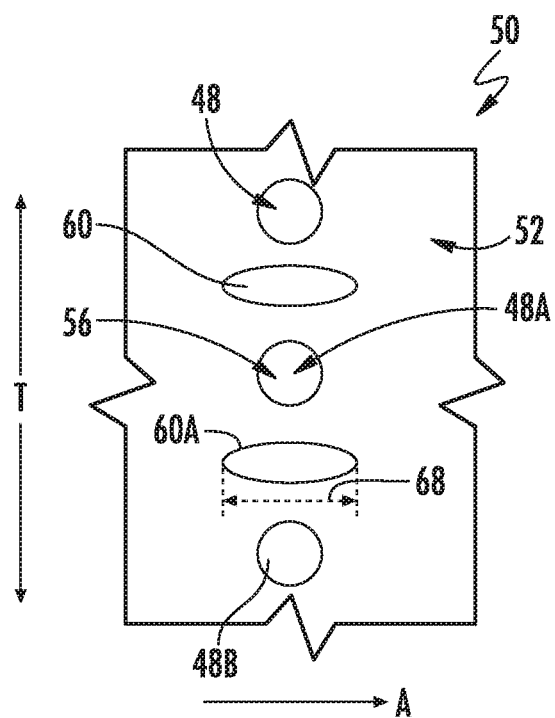
FIG. 4 is a plan view of one side of a section the exemplary liner FIG. 2.

Referring now also to FIG. 4, a plan view is depicted of the first side 52 of the liner 50 of FIGS. 2 and 3. As is shown, the liner 50 generally defines a row of dilution holes 48 spaced along the transverse direction T, and further includes a plurality of airflow features 60, with each airflow feature 60 positioned between two adjacent dilution holes 48 (e.g., the first airflow feature 60A positioned between the first dilution hole 48A and the second dilution hole 48B). As is shown in FIG. 4, it will be appreciated that each of the airflow features 60 (including the first airflow feature 60A) further defines a length 68 along the airflow direction A. The length 68 of the first airflow feature 60A may be greater than or equal to about 0.5 times the diameter 62 of the first dilution hole 48A that it is positioned adjacent to, such as up to about five (5) times the diameter 62 of such first dilution hole 48A. For example, the length 68 of first airflow feature 60A may be greater than or equal to the diameter 62 of the first dilution hole 48A to which it is positioned adjacent to, such as at least 1.25 times the diameter 62 of such first dilution hole 48A, such as at least 1.5 times the diameter 62 of such first dilution hole 48A, such as less than about 4.5 times the diameter 62 of such first dilution hole 48A, such as less than about four (4) times the diameter 62 such first dilution hole 48A. Notably, however, in other embodiments, the first airflow feature 60A may have any other suitable size.

It should be appreciated that although only the dimensions of the first airflow feature 60A are described above, each of the plurality of airflow features 60 may have substantially the same dimensions as the first airflow feature 60A discussed above. Notably, however, in other embodiments, the plurality of airflow features 60 may have different sizes, shapes, and/or configurations. For example, in other embodiments, the first airflow feature 60A may be longer, higher, and/or wider than the second airflow feature 60B, or vice versa.

As will also be appreciated from the view depicted in FIG. 4, along with the cross-sectional view of FIG. 3, for the embodiment depicted, the airflow features 60 each define an aerodynamic profile. As used herein, the term "aerodynamic profile" refers generally to including no sharp or jagged edges exposed to an airflow thereover (e.g., only rounded edges having a radius approximately equal to or greater than the smallest dimension the airflow feature 60, such as the smallest of its height, width, or length). Further, as is seen more particularly in FIG. 4, each of the airflow features 60 defines a perimeter shape. For the embodiment depicted, the perimeter shape of each airflow feature 60 is substantially an ellipse, a circle, or an oval, and more specifically still, for the embodiment depicted, is substantially an ellipse.

Figure 5:
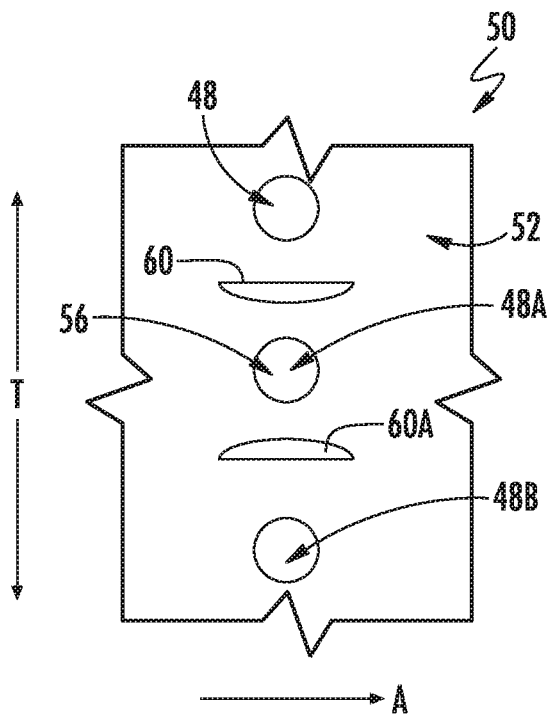
FIG. 5 is a plan view of one side of a section of a liner of a gas turbine engine combustor in accordance with another exemplary embodiment of the present disclosure.

It should be appreciated, however, that in other exemplary embodiments, one or more of the airflow features 60 may have any other suitable shape, such as any other suitable perimeter shape. For example, in other embodiments, the perimeter shape of one or more of the airflow features 60 may be substantially a circle or substantially an oval. Additionally, or alternatively, in other embodiments, the perimeter shape of one or more of the airflow features 60 may be in asymmetric shape. For example, referring briefly to FIG. 5, providing a plan view of a first side 52 of a liner 50 in accordance with another exemplary embodiment of the present disclosure, one or more of the airflow features 60 may define a perimeter shape that is substantially half of an ellipse, half of a circle, or half of an oval. More specifically, for the embodiment shown, each of the plurality of airflow features 60 is substantially half of an ellipse, with a flat side thereof substantially aligned with the airflow direction A.

Figure 6:
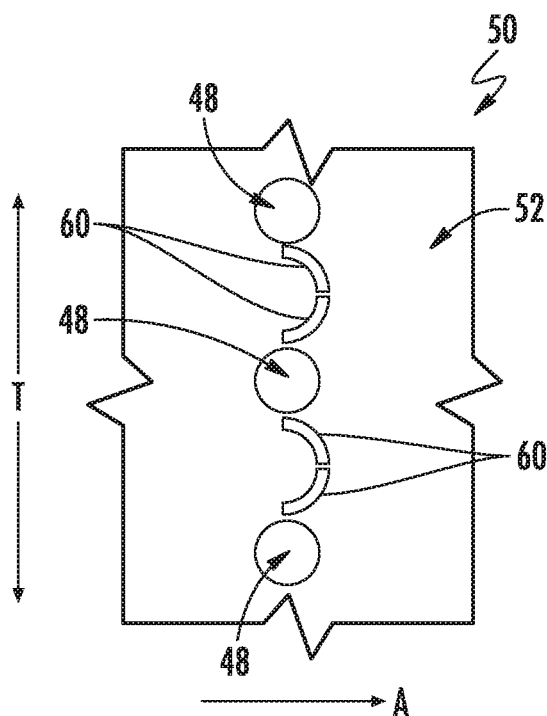
FIG. 6 is a plan view of one side of a section of a liner of a gas turbine engine combustor in accordance with yet another exemplary embodiment of the present disclosure.
Figure 7:
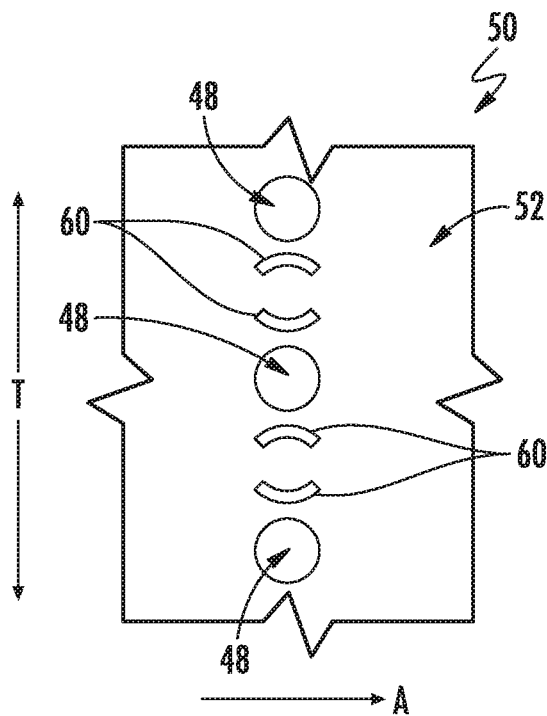
FIG. 7 is a plan view of one side of a section of a liner of a gas turbine engine combustor in accordance with still another exemplary embodiment of the present disclosure.

Further, in still other exemplary embodiments, one or more the airflow features 60 may not necessarily define an aerodynamic profile. For example, referring now briefly to FIGS. 6 and 7, plan views are depicted of a first side 52 of liners 50 in accordance with two additional embodiments of the present disclosure. Each of the liners 50 depicted in FIGS. 6 and 7 may be configured in substantially the same manner as exemplary liner 50 described above with reference to FIGS. 2 through 4. Accordingly, it will be appreciated that each of the liners 50 defines a plurality of dilution holes 48 and includes a plurality of airflow features 60 positioned adjacent to the dilution holes 48. However, for the embodiment depicted, each of the airflow features 60 depicted in FIGS. 6 and 7 are rib features. More specifically, each of the airflow features 60 is a rib protruding from a surface 58 of the liner 50 on the first side 52. These rib features may define a height 66, or rather, a maximum height 66, similar to the height 66 of the first airflow feature 60A described above with reference to FIGS. 2 through 4. Further, the rib features may also define a length 68 along the airflow direction A similar to the length 68 of the first airflow feature 60A described above with reference to FIG. 2 through 4.

It will be appreciated that both the aerodynamic-profiled airflow features 60 and the rib configuration airflow features 60 may increase a cooling of the liner 50, and more specifically, may reduce a hotspot formation on the first side 52 of the liner 50. However, it will be appreciated that the various airflow features 60 may accomplish this end goal in different manners.

For example, the aerodynamic airflow feature 60 may result in a wider dispersion of relatively cool airflow through the dilution hole 48, providing for a greater amount of such airflow staying closer to the first side of the liner 50, and therefore reducing hotspot formation on the first side of the liner 50. By contrast, the rib-featured airflow feature 60 may increase a turbulence surrounding the outlet of the dilution hole 48 on the first side of the liner 50, increasing a mixing the relatively cool air through the dilution hole 48 with the hot air in the combustion chamber 20. Such may also reduce hotspot formation on the first side of the liner 50.

Figure 8:
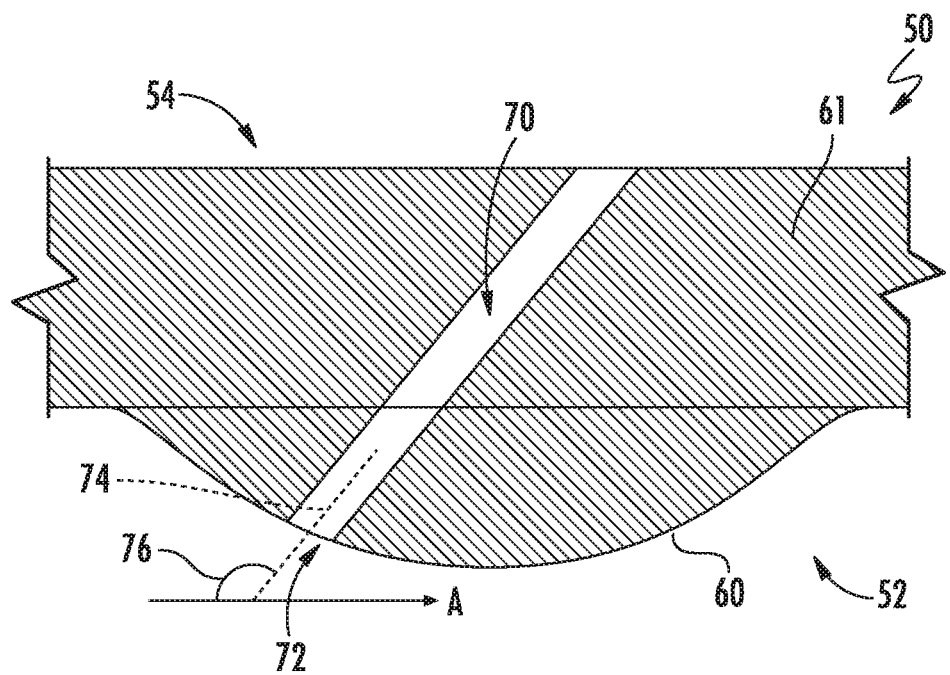
FIG. 8 is a cross-sectional view of an airflow feature on one side of a liner of a gas turbine engine combustor in accordance with another exemplary embodiment of the present disclosure.
Figure 9:
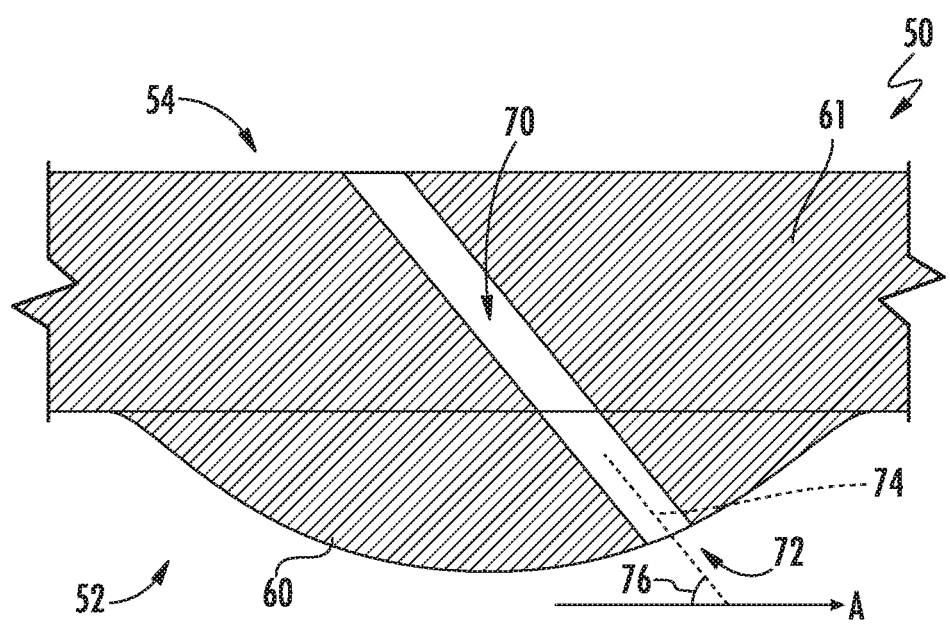
FIG. 9 is a cross-sectional view of an airflow feature on one side of a liner of a gas turbine engine combustor in accordance with yet another exemplary embodiment of the present disclosure.

Referring now to FIGS. 8 and 9, it will be appreciated that in at least certain exemplary embodiments, the liner 50 may further include a cooling hole 70 extending therethrough, and more specifically, extending from the second side 54 of the liner 50 and through the airflow feature 60, defining a cooling hole outlet 72 on the airflow feature 60. More specifically, FIGS. 8 and 9 provide side, cross-sectional views of airflow features 60 of liners 50 in accordance with additional exemplary embodiments, as viewed along the transverse direction T of the combustion chamber 20. For example, in certain embodiments, the airflow features 60 depicted in FIGS. 8 and 9 may be configured in a similar manner to one or more the exemplary airflow features 60 described above with reference to FIGS. 2 through 4. Inclusion of a cooling hole 70 extending through the liner 50 and defining a cooling hole outlet 72 on the airflow feature 60 may assist with maintaining a temperature of the airflow feature 60 itself within a desired operating temperature range. Referring particularly to FIG. 8, it will be appreciated that in at least certain exemplary embodiments, the cooling hole 70 may extend in a direction generally opposite the airflow direction A. For example, for the embodiment of FIG. 8, the cooling hole 70 defines a centerline 74 proximate the outlet 72, with the centerline 74 defining an angle 76 with the airflow direction A greater than ninety (90) degrees and less than one hundred and eighty (180) degrees, as viewed from an upstream end. Additionally for the embodiment of FIG. 8, the outlet 72 is positioned proximate an upstream end of the airflow feature 60. However, referring now particularly to FIG. 9, it will be appreciated that in other exemplary embodiments, the cooling hole 70 may instead extend in a direction generally along the airflow direction A. For example, for the embodiment of FIG. 9, the cooling hole 70 again defines a centerline 74 proximate the outlet 72 of the cooling hole 70 with the centerline 74 defining an angle 76 less than ninety (90) degrees and greater than zero (0) degrees, as viewed from an upstream end. Additionally, for the embodiment of FIG. 9, the outlet 72 is positioned proximate a downstream end of the airflow feature 60. Each of these embodiments may assist with effectuating a cooling of the airflow feature 60 in different ways.

It will be appreciated, however, that in other exemplary embodiments, the cooling hole 70 of FIG. 8 (extending in a direction generally opposite the airflow direction A, with a centerline 74 defining an angle 76 greater than ninety (90) degrees with the airflow direction A) may instead define an outlet 72 positioned proximate a downstream end of the airflow feature 60 (as with the cooling hole 70 of FIG. 9). Similarly, in still other embodiments the cooling hole 70 of FIG. 9 (extending in a direction generally along the airflow direction A, with a centerline 74 defining an angle 76 less than ninety (90) degrees with the airflow direction A) may instead define an outlet 72 positioned proximate an upstream end of the airflow feature 60 (as with the cooling hole 70 of FIG. 8). Further in still other exemplary embodiments, the liner 50 may include a plurality of cooling holes 70 defining outlets 72 on an individual airflow feature 60, with such cooling holes 70 extending along the airflow direction A, counter to the airflow direction A, aligned with one another, misaligned relative to one another, or a combination thereof.

Figure 10:
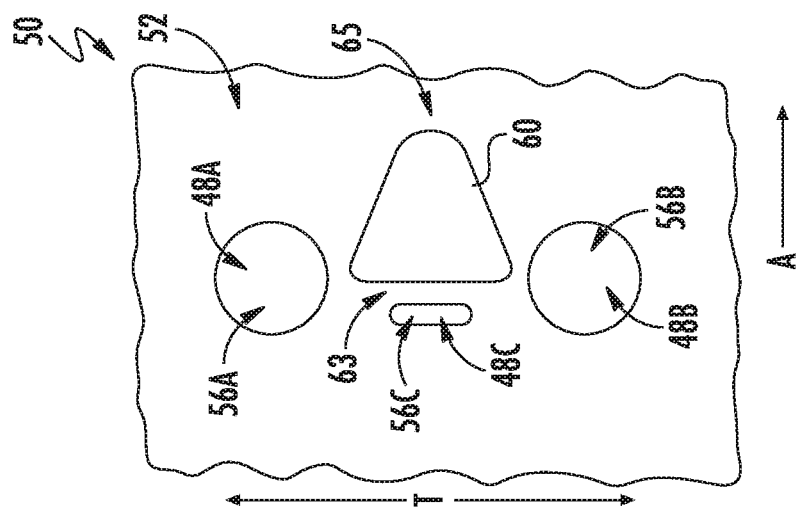
FIG. 10 is a plan view of one side of a section of a liner of a gas turbine engine combustor in accordance with yet another exemplary embodiment of the present disclosure.

Further, referring now to FIG. 10, it will be appreciated that in other embodiments, the liner 50 may include any other design for maintaining a temperature of the one or more airflow features 60 within a desired operating temperature range. FIG. 10 provides a plan view of a first side 52 of a liner 50 in accordance with another exemplary embodiment of the present disclosure. The exemplary liner 50 of FIG. 10 may be configured in substantially the same manner as the exemplary liner 50 described above with reference to FIGS. 2 through 4. Accordingly, it will be appreciated that the liner 50 generally defines a dilution hole 48 extending through the liner 50 and an airflow feature 60 on the first side 52 of the liner 50 adjacent to the dilution hole 48 to increase a cooling of the liner 50. The airflow feature 60 is configured as a protrusion, and therefore extends into the combustion chamber 20. More specifically, for the embodiment depicted, the liner 50 defines a first dilution hole 48A and a second dilution hole 48B spaced along a transverse direction T (i.e., transverse relative to an airflow direction A defined by the combustion chamber 20), with the airflow feature 60 positioned therebetween along the transverse direction T.

Notably, it will be appreciated that for the embodiment depicted, the airflow feature 60 defines a perimeter shape different than a perimeter shape of the airflow features 60 described above. More specifically, for the embodiment of FIG. 10, the airflow feature 60 defines a perimeter shape that is substantially triangular, with a flat end 63 of the triangle facing upstream and a pointed end 65 of the triangle facing downstream.

Furthermore, it will be appreciated that the liner 50 includes features for maintaining a temperature of the airflow feature 60 within a desired operating temperature range during operation of the combustor. More specifically, the liner 50 further defines a third dilution hole 48C extending through the liner 50 and defining an outlet 56C, with the outlet 56C of the third dilution hole 48C positioned on the airflow feature 60. More specifically, the outlet 56C of the third dilution hole 48C is positioned proximate an upstream end of the airflow feature 60, which for the embodiment shown is the flat end 63 of the triangular-perimeter-shaped airflow feature 60. In such a manner, it will be appreciated that the third dilution hole 48C may provide a relatively large amount of airflow over the airflow feature 60 (as compared to, e.g., a cooling hole 70; see FIGS. 8 and 9) to maintain a temperature of the airflow feature 60 within the desired operating temperature range. Notably, as used herein, the term "proximate" refers to being closer to one end than an opposite end.

It will be appreciated that for the embodiment depicted, the third dilution hole 48C may be referred to as "minor" dilution hole, as compared to the first dilution hole 48A and second dilution hole 48B. For example, the third dilution hole 48C may be configured to provide less dilution airflow to the combustion chamber 20 than either of the first dilution hole 48A or the second dilution hole 48B. For example, the third dilution hole 48C may be configured to provide between about twenty-five (25) percent and about ninety (90) percent of the dilution airflow that the first dilution hole 48A provides, such as at least about thirty (30) percent, such as at least about thirty-five (35) percent, such as at least about forty (40) percent, such as less than about eighty-five (85) percent, such as less than about seventy-five (75) percent, such as less than about seventy (70) percent of the dilution airflow that the first dilution hole 48A provides. For example, the first dilution hole 48A and second dilution hole 48B may define a cross-sectional area at their respective outlets 56A, 56B that is substantially the same, while the third dilution hole 48C may define a cross-sectional area at its outlet 56C that is less than the cross-sectional areas of the outlets 56A, 56B. For example, the cross-sectional area of the outlet 56C of the third dilution hole 48C may be between about twenty-five (25) percent and about ninety (90) percent of the cross-sectional area of the outlet 56A of the first dilution hole 48A, such as at least about thirty (30) percent, such as at least about thirty-five (35) percent, such as at least about forty (40) percent, such as less than about eighty-five (85) percent, such as less than about seventy-five (75) percent, such as less than about seventy (70) percent of the cross-sectional area of the outlet 56A of the first dilution hole 48A.

Figure 11:
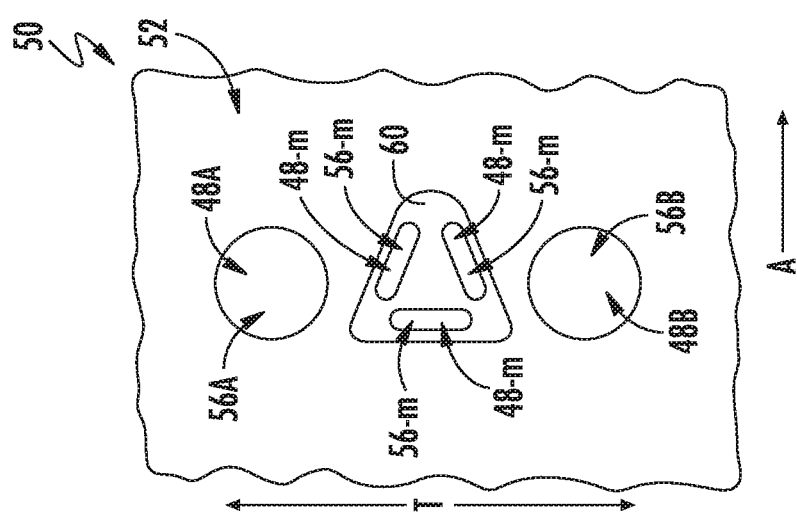
FIG. 11 is a plan view of one side of a section of a liner of a gas turbine engine combustor in accordance with still another exemplary embodiment of the present disclosure.
Figure 12:
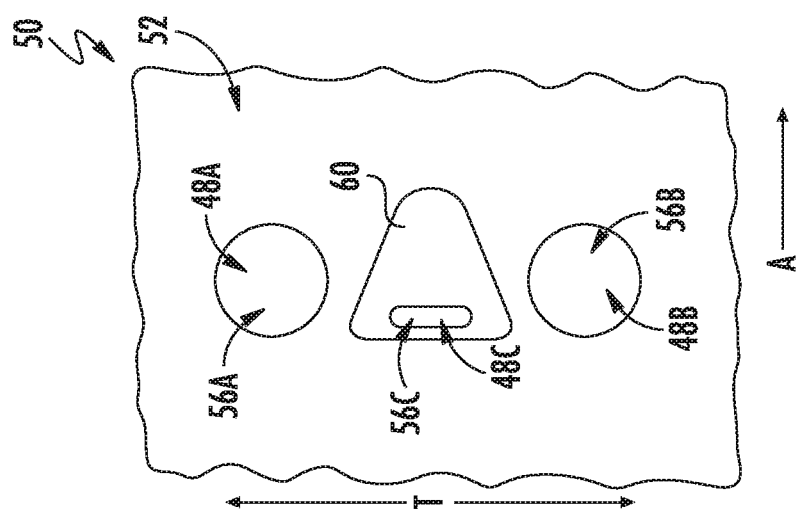
FIG. 12 is a plan view of one side of a section of a liner of a gas turbine engine combustor in accordance with yet another exemplary embodiment of the present disclosure.

It will further be appreciated that in other exemplary embodiments, the liner 50 may have still other suitable configurations for maintaining a temperature of the airflow feature 60 within a desired operating temperature range. For example, reference will now be made to FIGS. 11 and 12. FIGS. 11 and 12 each provide a plan view of first sides 52 of liners 50 in accordance with still other exemplary embodiments of the present disclosure. Each of the exemplary embodiments of FIGS. 11 and 12 may be configured in substantially the same manner as exemplary liner 50 described above with reference to FIG. 10.

Accordingly, it will be appreciated that the liners 50 each generally define a first dilution hole 48A and a second dilution hole 48B, each of the first and second dilution holes 48A, 48B extending through the liner 50, and an airflow feature 60 on the first side 52 of the liner 50 adjacent to the first and second dilution holes 48A, 48B, and more specifically, positioned between the first and second dilution holes 48A, 48B, and extending into the combustion chamber 20 (i.e., configured as a protrusion). Further, the liner 50 defines a third dilution hole 48C also positioned between the first and second dilution holes 48A, 48B along a transverse direction T.

Referring particularly to FIG. 11, however, it will be appreciated that for the embodiment shown, the liner 50 further defines a plurality of dilution holes 48 position between the first dilution hole 48A and second dilution hole 48B. More particularly, the plurality of dilution holes 48 includes a plurality of "minor" dilution holes 48-*m*, and more specifically still, includes three minor dilution holes 48-*m*. Each of these three minor dilution holes 48-*m* defines an outlet 56-*m* positioned on the airflow feature 60.

Additionally, referring now particularly to FIG. 12, for the embodiment shown, the liner 50 further defines a third dilution hole 48C, similar to the embodiment of FIG. 10. The third dilution hole 48C defines an outlet 56C positioned between the first and second dilution holes 48A, 48B. However, for the embodiment shown, the outlet 56C is not positioned on the airflow feature 60. Instead, for the embodiment shown, the outlet 56C of the third dilution hole 48C is positioned upstream of the airflow feature 60 at a location generally between the first dilution hole 48A and the second dilution hole 48B.

Further, it will be appreciated that the particular configurations of minor dilution holes depicted in FIGS. 10 through 12 (holes 48C, 48-*m*) are by way of example only. For example, in certain exemplary embodiments, one or more of the minor dilution holes may be positioned forward of a particular airflow feature 60 (such as in the embodiment of FIG. 12), may be position aft of a particular airflow feature 60, or both. Additionally, or alternatively, one or more of the minor dilution holes may be angled with respect to a particular airflow feature 60 (e.g., offset along the transverse direction T from the airflow feature 60 such that it is not exactly aligned along the airflow direction A).

Inclusion of a liner 50 in accordance with one or more these exemplary embodiments may ensure that the airflow feature 60 (provided to increase a cooling of the liner 50) is itself cooled and maintained within a desired operating temperature range.

Figure 13:
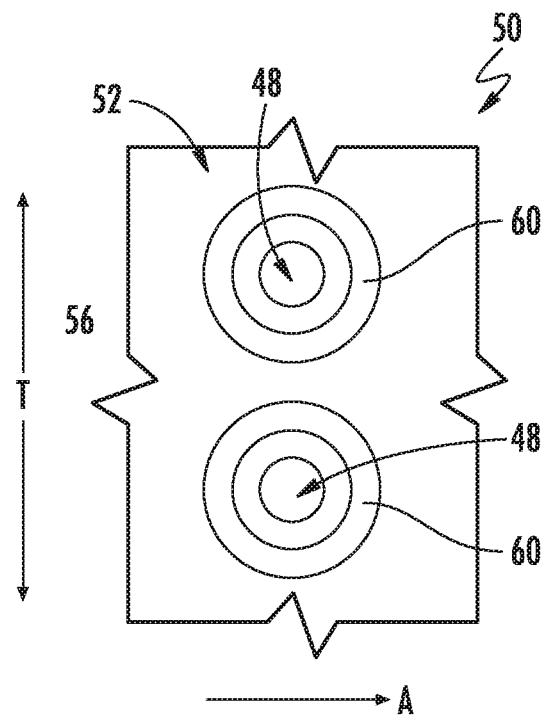
FIG. 13 is a plan view of one side of a section of a liner of a gas turbine engine combustor in accordance with still another exemplary embodiment of the present disclosure.
Figure 14:
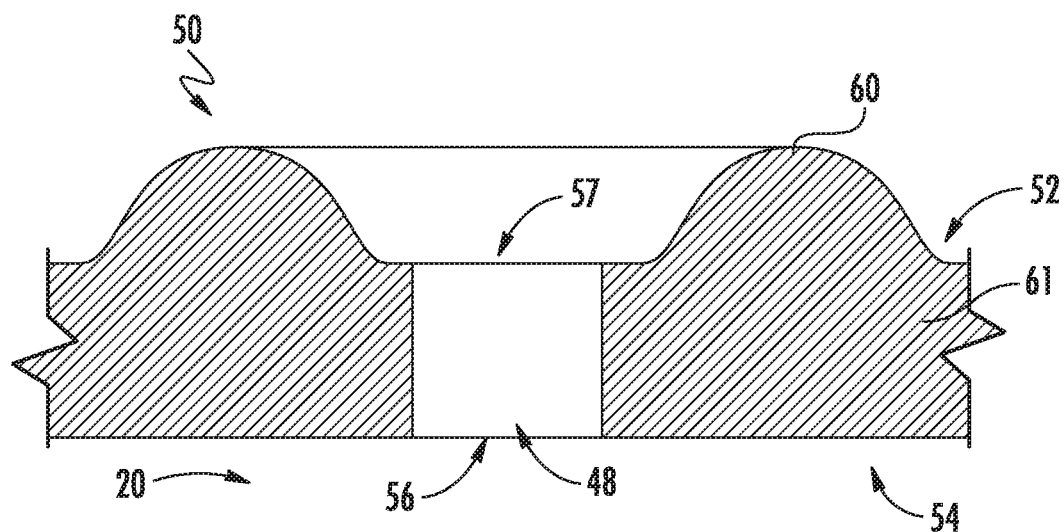
FIG. 14 is a cross-sectional view of an airflow feature on one side of the exemplary liner of FIG. 13.

Moreover, it will be appreciated that although for the exemplary embodiments described above, the airflow feature 60 is generally an isolated feature positioned at a discreet location adjacent to an outlet 56 of a dilution hole 48, in other embodiments, the airflow feature 60 may be configured in any other suitable manner. For example, referring now to FIGS. 13 and 14, a liner 50 in accordance with yet another exemplary embodiment of the present disclosure is provided. The exemplary liner 50 of FIGS. 13 and 14 may be configured in substantially the same manner as the exemplary liner 50 described above with reference to FIG. 2 through 4. For example, the liner 50 generally defines a first side 52, a second side 54 opposite the first side 52, and a dilution hole 48 extending between the first side 52 and the second side 54 and defining a diameter 62. The liner 50 also defines at least in part a combustion chamber 20, with one of the first side 52 or second side 54 being exposed to the combustion chamber 20. The liner 50 additionally includes an airflow feature 60 extending from the first side 52 of the liner 50 adjacent to the dilution hole 48 to increase a cooling of the liner 50.

However, for the embodiment shown, the airflow feature 60 is instead configured as a ring extending substantially completely around the dilution hole 48. More specifically, for the embodiment shown, the airflow feature 60 extends completely around an inlet 57 of the dilution hole 48. Additionally, for the embodiment shown, the second side 54 of the liner 50 is exposed to the combustion chamber 20, and accordingly, the first side 52 is instead a "cold side" of the liner 50. However, it will be appreciated that in other embodiments, the first side 52 may instead be exposed to the combustion chamber 20, such that the first side 52 is a "hot side" and the second side 54 is a "cold side."

Figure 15:
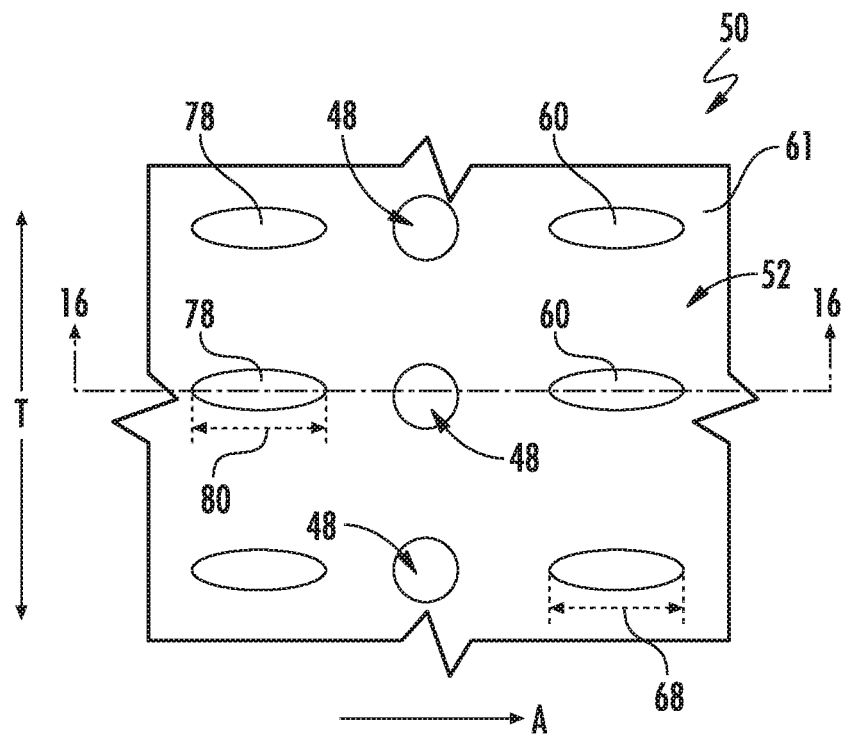
FIG. 15 is a plan view of one side of a section of a liner of a gas turbine engine combustor in accordance with another exemplary embodiment of the present disclosure.

Furthermore, it will be appreciated that although for the exemplary embodiments described above, the airflow features 60 are generally positioned adjacent to the inlet 57 of a dilution hole 48 along the transverse direction T, in other embodiments, the airflow feature 60 may have any other suitable configuration. For example, referring now to FIGS. 15 and 16, a liner 50 in accordance with yet another exemplary embodiment of the present disclosure is provided. FIG. 15 provides a plan view of a first side 52 of the exemplary liner 50, and FIG. 16 provides a cross-sectional view of the liner 50 along Line 16-16 in FIG. 15.

Figure 16:
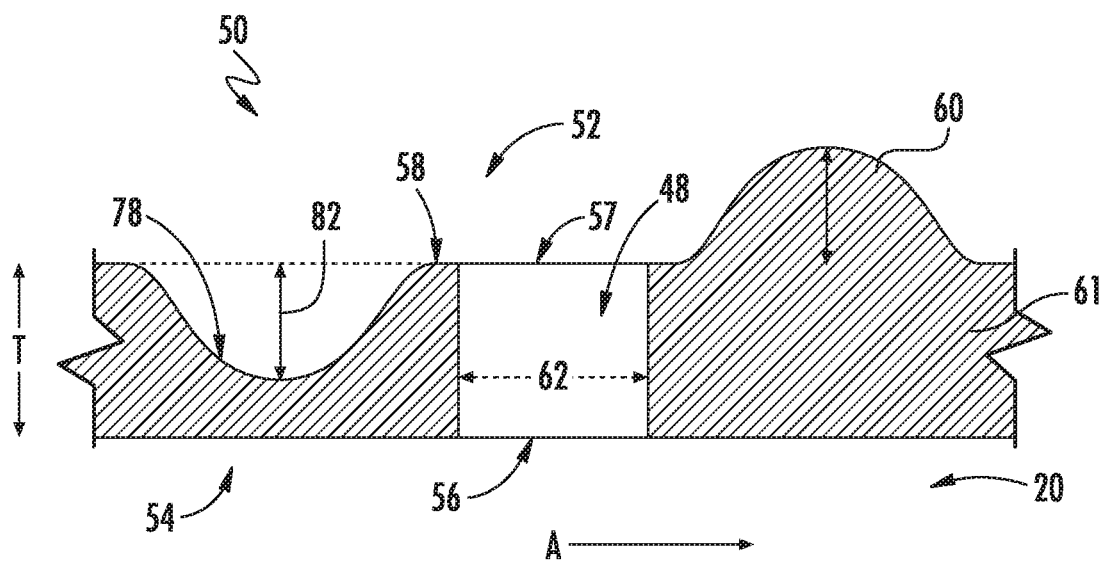
FIG. 16 is a cross-sectional view of an airflow feature on one side of the exemplary liner of FIG. 15.

The exemplary liner 50 of FIGS. 15 and 16 may be configured in substantially the same manner as the exemplary liner 50 described above with reference to FIG. 2 through 4. For example, the liner 50 generally defines a first side 52, a second side 54 opposite the first side 52, and a dilution hole 48 extending between the first side 52 and the second side 54 and defining a diameter 62 (FIG. 16). The liner 50 also defines at least in part a combustion chamber 20, with one of the first side 52 or second side 54 being exposed to the combustion chamber 20. The liner 50 additionally includes an airflow feature 60 the first side 52 of the liner 50 adjacent to the dilution hole 48 to increase a cooling of the liner 50. For the embodiment shown, the airflow feature 60 is configured as a protrusion, and therefore extends from the first side 52 of the liner 50, and more specifically extends from the base wall portion 61 of the liner 50.

Additionally, for the embodiment shown, the second side 54 of the liner 50 is exposed to the combustion chamber 20, and accordingly, the first side 52 is a "cold side" of the liner 50 and the second side 54 is a "hot side." However, it will be appreciated that in other embodiments, the first side 52 may instead be exposed to the combustion chamber 20, such that the first side 52 is a "hot side" and the second side 54 is a "cold side."

Moreover, as previously noted the combustion chamber 20 of the combustor generally defines an airflow direction A over the dilution hole 48 on the second side 54 of liner 50, as well as a transverse direction T perpendicular to the airflow direction A (and at least locally parallel to the second side 54 of the liner 50). For the embodiment depicted, the airflow feature 60 is positioned adjacent to the dilution hole 48 along the airflow direction A, and more specifically, the airflow feature 60 is positioned downstream of the dilution hole 48 along the airflow direction A, and substantially aligned with the dilution hole 48 along the transverse direction T.

As noted above, the airflow direction A may define a swirl angle 59 with the longitudinal direction L of the combustor within which the liner 50 is installed (see FIG. 2). Accordingly, as the airflow feature 60 is aligned with the dilution hole 48 along the airflow direction A for the embodiment shown, the airflow feature 60 may be aligned with the dilution hole 48 along the swirl of the combustor (i.e., swirl of the combustion gasses through a combustion chamber of the combustor).

Notably, as with certain of the exemplary embodiments discussed above, the exemplary airflow feature 60 depicted defines an aerodynamic profile and further defines a length 68 along the airflow direction A. For the embodiment shown, the length 68 of the airflow feature 60 is greater than or equal to the diameter 62 of the dilution hole 48, such as greater than or equal to about 1.1 times the diameter 62 the dilution hole 48, such as greater than greater or equal to about 1.25 times the diameter 62 of the dilution hole 48, such as less than or equal to about five (5) times the diameter 62 of the dilution hole 48.

Inclusion of an airflow feature 60 in accordance with such an exemplary embodiment may create a turbulence in the airflow through the dilution hole 48, such that the airflow spreads out more evenly adjacent to the second side 54 of the liner 50, such that less hotspots are created on the second side 54 of the liner 50.

Referring still to FIGS. 15 and 16, the liner 50 further defines an indentation 78 in the first side 52 of the liner 50. The indentation 78 is positioned adjacent to the dilution hole 48 along the airflow direction A at a location upstream of the dilution hole 48 along the airflow direction A. Inclusion of the indentation 78 may further assist with the reduction in hotspot formations on the second side 54 of the liner 50, by further creating turbulence in the airflow through the dilution hole 48. Further, will be appreciated that the indentation 78 generally defines a length 80 (FIG. 15) along the airflow direction A and a depth 82 (FIG. 16). The depth 82 may be defined relative to a local plane of a surface 58 on the first side 52 of the liner 50. It will be appreciated that in certain exemplary embodiments, the depth 82 of the indentation 78 may have a similar value as the height 66 of the first airflow feature 60A described above and similarly, the length 80 of the indentation 78 may have a similar value as the length 68 of the first airflow feature 60A described above.

Figure 17:
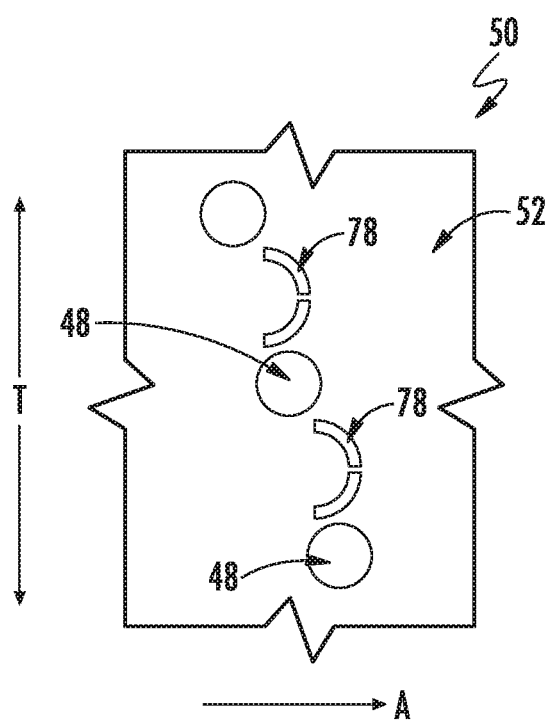
FIG. 17 is a plan view of one side of a section of a liner of a gas turbine engine combustor in accordance with another exemplary embodiment of the present disclosure.

Moreover, it will be appreciated that in yet other exemplary embodiments of the present disclosure, the liner 50 may not include airflow features 60, and instead may include other indentations 78 or features. For example, referring now briefly to FIG. 17, yet another exemplary embodiment present disclosure is provided wherein the first side 52 of the liner 50 defines a plurality of slots 84 positioned adjacent to one or more dilution holes 48. The plurality of slots 84 may be configured in a similar manner to the exemplary minor dilution holes (holes 48C, 48-m) described above with reference to FIGS. 10 through 12 (i.e., bringing cool air from the cold side to the hot side). These slots 84 may further be used alone or in coordination with other airflow features 60 and/or indentations 78.

Moreover, it will be appreciated that although for the various exemplary liners 50 described above with reference to FIGS. 2 through 12, the first side 52 of the liner 50 is described as being exposed to the combustion chamber 20 of the combustor 10 (and therefore configured as the "hot side"), in other embodiments, the second side 54 of the liner 50 may instead be exposed to the combustion chamber 20 (and therefore configured as the "hot side"). Accordingly, it will be appreciated that in other exemplary embodiments of the present disclosure, one or more of the exemplary airflow features 60 described and depicted as being on a "hot side" of the liner a may additionally, or alternatively, be positioned on a "cold side" of the liner 50. Similarly, one or more the exemplary airflow features 60 (or indentations 78) described as depicted as being on a "cold side" of liner 50 may additionally, or alternatively, be positioned on a "hot side" of the liner 50. It will be appreciated, that inclusion of one or more airflow features 60 on the cold side of a liner may have an added benefit of increasing a heat transfer coefficient of the liner due to an increase in surface area exposed to the relatively cool air over the cold side of the liner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine combustor comprising:
    a liner defining at least in part:
        a combustion chamber,
        a first side exposed to the combustion chamber,
        a second side opposite the first side,
        a plurality of cooling holes extending from the second side to the first side, and
        a dilution hole extending from the second side to the first side,
    wherein the dilution hole is larger in diameter than each of the plurality of cooling holes,
    wherein the liner comprises an airflow feature on the first side of the liner adjacent to the dilution hole, a mass of which extends into the combustion chamber to increase a cooling of the liner,
    wherein the combustion chamber defines an airflow direction over the dilution hole on the first side of the liner and a transverse direction perpendicular to the airflow direction,
    wherein the airflow feature is positioned adjacent to the dilution hole along the transverse direction,
    wherein the dilution hole of the liner is a first dilution hole, wherein the liner further defines a second dilution hole spaced from the first dilution hole along the transverse direction, and
    wherein the airflow feature is positioned between the first dilution hole and the second dilution hole.

2. The gas turbine engine combustor of claim 1, wherein the airflow feature defines a perimeter shape, and wherein the perimeter shape is an ellipse, a circle, or an oval.

3. The gas turbine engine combustor of claim 1, wherein the airflow feature defines a perimeter shape, and wherein the perimeter shape is half of an ellipse, half of a circle, or half of an oval.

4. The gas turbine engine combustor of claim 1, wherein the first dilution hole defines a diameter, wherein the airflow feature defines a width, and wherein the width of the airflow feature is greater than 0.25 times the diameter and less than 5 times the diameter.

5. The gas turbine engine combustor of claim 1, wherein the first dilution hole defines a diameter, wherein the airflow feature defines a height, and wherein the height of the airflow feature is greater than 0.25 times the diameter and less than 5 times the diameter.

6. The gas turbine engine combustor of claim 1, wherein the liner further defines a secondary cooling hole through the liner, and wherein the secondary cooling hole defines an outlet on the airflow feature.

7. The gas turbine engine combustor of claim 6, wherein the secondary cooling hole extends generally along the airflow direction.

8. The gas turbine engine combustor of claim 6, wherein the secondary cooling hole extends generally opposite the airflow direction.

9. The gas turbine engine combustor of claim 1, wherein the airflow feature defines an aerodynamic profile.

10. The gas turbine engine combustor of claim 1, wherein the gas turbine engine combustor defines a longitudinal direction, and wherein the airflow direction defines a swirl angle greater than zero with the longitudinal direction.

11. The gas turbine engine combustor of claim 1, wherein the first dilution hole has a diameter that is at least five times that of a diameter of one of the plurality of the cooling holes.

12. A gas turbine engine combustor comprising:
    a liner defining at least in part:
        a combustion chamber,
        a first side exposed to the combustion chamber,
        a second side opposite the first side,
        a plurality of cooling holes extending from the second side to the first side, and
        a dilution hole extending from the second side to the first side,
    wherein the dilution hole is larger in diameter than each of the plurality of cooling holes,
    wherein the liner comprises an airflow feature on the first side of the liner adjacent to the dilution hole, a mass of which extends into the combustion chamber to increase a cooling of the liner,
    wherein the combustion chamber defines an airflow direction over the dilution hole on the first side of the liner and a transverse direction perpendicular to the airflow direction,
    wherein the airflow feature is positioned adjacent to the dilution hole along the transverse direction,
    wherein the airflow feature is a first airflow feature,
    wherein the liner further comprises a second airflow feature on the first side of the liner extending into the combustion chamber, and wherein the second airflow feature is positioned on an opposite side of the dilution hole from the first airflow feature along the transverse direction.

13. A gas turbine engine combustor comprising:
a liner defining at least in part:
   a combustion chamber,
   a first side exposed to the combustion chamber,
   a second side opposite the first side,
   a plurality of cooling holes extending from the second side to the first side, and
   a dilution hole extending from the second side to the first side,
wherein the dilution hole is larger in diameter than each of the plurality of cooling holes,
wherein the liner comprises an airflow feature on the first side of the liner adjacent to the dilution hole, a mass of which extends into the combustion chamber to increase a cooling of the liner,
wherein the combustion chamber defines an airflow direction over the dilution hole on the first side of the liner and a transverse direction perpendicular to the airflow direction,
wherein the dilution hole of the liner is a first dilution hole,
wherein the liner further defines a second dilution hole spaced from the first dilution hole along the transverse direction,
wherein the airflow feature is positioned between the first dilution hole and the second dilution hole, and
wherein the liner further defines a third dilution hole extending through the liner and defining an outlet on the airflow feature.

14. The gas turbine engine combustor of claim 13,
wherein the first dilution hole defines an outlet having a cross-sectional area,
wherein the third dilution hole defines an outlet having a cross-sectional area, and
wherein the cross-sectional area of the outlet of the third dilution hole is less than the cross-sectional area of the outlet of the first dilution hole.

15. A gas turbine engine combustor comprising:
a liner defining:
   a first side,
   a second side opposite the first side,
   a plurality of cooling holes extending from the first side to the second side,
   a dilution hole extending between the first side and the second side and defining a diameter, and
   a combustion chamber with the first side being exposed to the combustion chamber,
wherein the dilution hole is larger in diameter than each of the plurality of cooling holes,
wherein the liner comprises an airflow feature on the first side of the liner adjacent to the dilution hole, a mass of which extends into the combustion chamber to increase a cooling of the liner,
wherein the airflow feature defines an aerodynamic profile and a length greater than or equal to the diameter of the dilution hole,
wherein the combustion chamber defines an airflow direction over the dilution hole on the first side of the liner and a transverse direction perpendicular to the airflow direction,
wherein the airflow feature is positioned adjacent to the dilution hole along the transverse direction,
wherein the dilution hole of the liner is a first dilution hole, wherein the liner further defines a second dilution hole spaced from the first dilution hole along the transverse direction, and
wherein the airflow feature is positioned between the first dilution hole and the second dilution hole.

16. The gas turbine engine combustor of claim 15,
wherein the airflow feature is positioned downstream of the first dilution hole along the airflow direction,
wherein the liner defines an indentation in the first side of the liner, and
wherein the indentation is positioned adjacent to the first dilution hole along the airflow direction at a location upstream of the first dilution hole along the airflow direction.

17. The gas turbine engine combustor of claim 15,
wherein the diameter that is at least five times that of a diameter of one of the plurality of the cooling holes.

* * * * *